United States Patent [19]

Fulton

[11] 3,751,721

[45] Aug. 7, 1973

[54] SNS SUPERCURRENT DEVICE

[75] Inventor: Theodore Alan Fulton, Berkeley Heights, N.J.

[73] Assignee: Bell Telephone Laboratories, Incorporated, Murray Hill, N.J.

[22] Filed: Dec. 22, 1971

[21] Appl. No.: 210,841

[52] U.S. Cl. ............. 317/234, 307/306, 317/234 T, 331/107 S

[51] Int. Cl. ............. H01l

[58] Field of Search ............. 317/234 T; 307/306; 331/107 S

[56] References Cited

UNITED STATES PATENTS

| | | | |
|---|---|---|---|
| 3,564,351 | 2/1971 | McCumber | 317/234 T |
| 3,573,661 | 4/1971 | McCumber | 317/234 T |

*Primary Examiner*—John W. Huckert
*Assistant Examiner*—William D. Larkins
*Attorney*—W. L. Keefauver

[57] ABSTRACT

An improved SNS supercurrent device comprises a pair of superconductive regions, a relatively thick insulative region contiguous with and separating the superconductive regions from one another, and a normal metal region contiguous with both superconductive regions. The insulative region is of sufficient thickness to prevent substantial supercurrent tunneling therethrough when a current source is connected between the superconductive regions. Consequently, current, following the path of least resistance, flows in a path including the normal metal region. The junction defined by the normal metal region has a significantly reduced cross-sectional area which in turn means the device has lower critical supercurrents and higher resistances than heretofore attainable in SNS structures.

7 Claims, 2 Drawing Figures

SNS SUPERCURRENT DEVICE

BACKGROUND OF THE INVENTION

This invention relates to weak-link supercurrent devices and more particularly to improved superconductor-normal-metal-superconductor (SNS) devices.

In a number of device applications weak-link devices are electrically connected in parallel with one another and are required to satisfy approximately the condition that $$LI_c = \phi_o \tag{1}$$

where L is the total self-inductance of each parallel circuit, $I_c$ is the critical supercurrent for each weak-link device and $\phi_o$ is the well-known flux quantum equal to approximately $2.07 \times 10^{-15}$ Webers. For example, failure to satisfy this condition reduces the sensitivity of double-junction magnetometers of the type disclosed by J. E. Zimmerman in U. S. Pat. No. 3,445,760, and disadvantageously permits more than one trapped magnetic vortex to be supported in flux shuttle devices of the type described by P. W. Anderson, R. C. Dynes, and myself in copending application Ser. No. 128,445, filed on March 27, 1971, now U.S. Pat. No. 3,676,718 issued on July 11, 1972.

In practice it is difficult to make the self-inductance L smaller than about $10^{-12}$ Henries which means, therefore, that the critical supercurrent $I_c$ must milliampere in the neighborhood of one illiampere or less. Such low critical supercurrents are readily attainable in superconductor-insulator-superconductor (SIS) supercurrent devices, i.e., Josephson junctions, because the thin insulative layer (about 10 – 20 Angstroms thick) has a lower supercurrent carrying capacity than a normal metal. It is often difficult, however, to fabricate SIS devices in which the insulative layer is of uniform thickness, sufficiently thin to permit supercurrent tunneling therethrough and yet free from pin holes of short-circuits between the superconductive layers. For this reason, and others set forth in U. S. Pat. No. 3,593,661, issued on Apr. 6, 1971, to D. E. McCumber, it is advantageous to utilize SNS supercurrent structures in which the normal-metal layer may be of the order of 100 to 1,000 Angstroms thick which means that such devices are less sensitive to variations in the fabrication process and less susceptible to superconductor-to-superconductor short circuits. Unfortunately, in conventional SNS sandwich structures it is difficult to reduce the dimensions of the junction defined by the normal layer to less than about $10^{-3}$ cm $\times$ $10^{-3}$ cm, i.e., the junction area is typically not less than about $10^{-6}$ $cm^2$. Consequently, in the conventional SNS structures the critical supercurrent is typically about 100 milliamperes or more and the resistance is at most about $10^{-6}$ ohms.

It would be desirable, therefore, not only to reduce the critical supercurrent of an SNS structure in order that equation (1) might be satisfied, but also to increase its resistance in order to alleviate problems of impedance matching to conventional circuitry. Several obvious approaches leave numerous problems unresolved. For example, one skilled in the art might consider that the critical supercurrent in an SNS device could be reduced by operating the device at a temperature near its critical superconducting temperature. However, such a mode of operation renders the critical supercurrent highly sensitive to the precise temperature and consequently necessitates the use of elaborate and expensive temperature control equipment. Even with such equipment there would still be no assurance that the degree of control would be adequate to maintain the critical supercurrent in the range of one milliampere. Alternatively, one might consider simply making the normal-metal layer sufficiently thick so that the critical supercurrent is in the one milliampere range. Unfortunately, the critical supercurrent depends exponentially on the thickness of the normal metal layer. For large thicknesses, this exponential dependence places a critical tolerance on the precise thickness of the normal-metal layer, one of the problems sought to be avoided in the use of SNS devices instead of SIS devices. A third way in which one might attempt to reduce the cross-sectional area of an SNS device would be to fabricate the device in the form of a well-known point contact structure. In this type of device the cross-sectional area depends on the shape of the point as well as its depth of penetration into the normal-metal layer. Since, however, the precise area of the point and the depth of penetration cannot be accurately and reproducibly controlled, it is extremely difficult as a practical matter to fabricate reproducible point contact structures. Of course, since the cross-sectional junction area is not readily reproducible, neither are the critical supercurrent and resistance.

SUMMARY OF THE INVENTION

In accordance with an illustrative embodiment of my invention, however, the effective cross-sectional area of the junction of an SNS device is reduced and the corresponding resistance thereof increased by approximately three orders of magnitude. As compared with typical prior art SNS structures, the corresponding reduction in the critical supercurrent to about one milliampere is controllable and reproducible and represents an improvement by approximately two orders of magnitude over prior art SNS devices. My invention illustratively comprises a normal metal layer N, a first superconducting layer S1 formed on a first portion of a major surface of N, a second superconducting layer S2 formed on a second portion of N mutually exclusive with the first portion and defining therebetween an intermediate portion, and an insulating layer contiguous with and separating S1 and S2 from one another, and, in addition, having a minor surface thereof in contact with the intermediate portion. The insulative layer is made of sufficient thickness to prevent substantial supercurrent tunneling therethrough from S1 and S2 when a current source is connected between S1 and S2. Consequently, current, following the path of least resistance, flows in and along S1, then (due to the proximity effect) through a small region of N under the intermediate portion, and finally in and along S2.

BRIEF DESCRIPTION OF THE DRAWING

My invention, together with its various features and advantages, can be easily understood from the following more detailed description taken in conjunction with the accompanying drawing in which.

DETAILED DESCRIPTION

Figure 1:
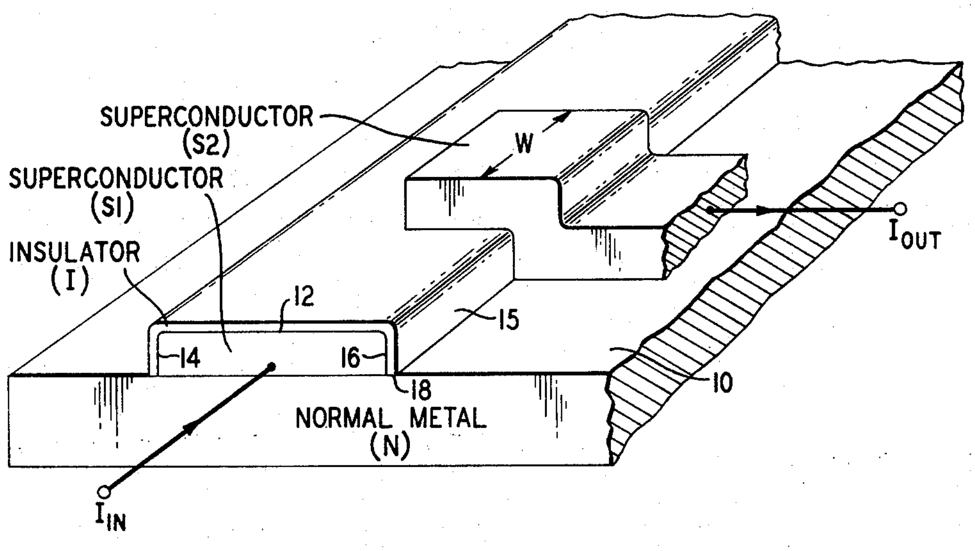
FIG. 1 is a perspective view of an illustrative embodiment of my invention.
Figure 2:
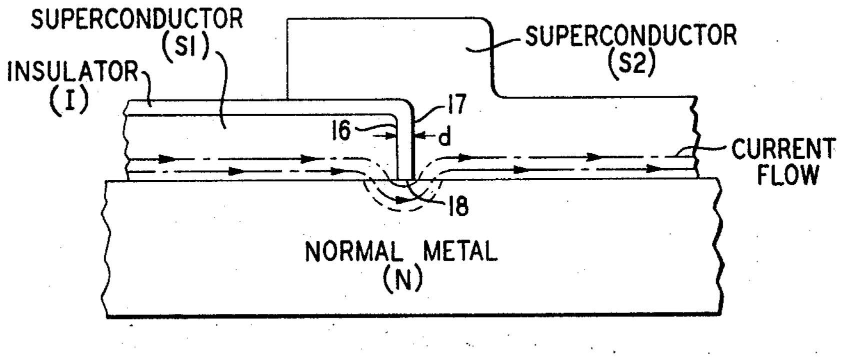
FIG. 2 is a partial end view of the structure of FIG. 1 showing the path which supercurrent follows in flowing between the superconductors.

Turning now to FIGS. 1 and 2, there is shown, in accordance with an illustrative embodiment of my invention, an SNS supercurrent device comprising a normal-metal layer N typically formed by well-known techniques on a substrate (not shown), and a first elongated superconductive layer S1 formed on a first portion of a major surface 10 of N. Layer S1 is illustratively oxidized by well-known techniques to form a relatively thick insulative layer I which typically covers the exposed major surface 12 of S1 as well as the exposed minor surfaces 14 and 16 of S1. Of course it may be possible to fabricate layer I by techniques other than oxidation, e.g., by a growth technique of the type described by J. R. Arthur, Jr. in U. S. Pat. No. 3,615,931, issued on Oct. 26, 1971. Next, a second superconducting layer S2 is formed contiguous with a second portion of the major surface 10 or N mutually exclusive from the first portion, and in addition contiguous with a portion of minor surface 15 of layer I.

Although the superconductors S1 and S2 are shown in overlapping relationship, this configuration is not essential. All that is required is that the superconductors S1 and S2 be formed on mutually exclusive portions of layer N and that they be separated from one another by an insulative layer I which is contiguous with that portion of minor surface 16 of S1 coextensive with the minor surface 17 of S2. Moreover, minor surface 18 of layer I is contiguous with layer N in the intermediate region which separates S1 from S2. In accordance with an illustrative embodiment of my invention, the insulative layer I is made sufficiently thick (dimension $d$) to prevent any substantial supercurrent tunneling therethrough when a current source (not shown) is connected between S1 and S2. Consequently, supercurrent, following the path of least resistance, flows instead through layer N in a relatively small region beneath the minor surface 18 of layer I as shown in FIG. 2. The supercurrent flow through N relies on the well-known proximity effect described in the aforementioned patent of D. E. McCumber.

If the width of S2 is given by $w$ (FIG. 1), then most of the current will pass through layer N in a semicylindrical volume of length $w$ and radius $d$, approximately, inasmuch as the electric field intensity is greatest in this volume. The effective cross-sectional area of this structure is the width of the cylinder times its radius, i.e., area = $wd$. Illustratively, the normal-metal layer N is evaporated gold or silver, the superconductors are evaporated tin, and the insulator is tin-oxide with a depth $d$ of about 100 Angstroms. Typically, $w$ is approximately $10^{-3}$ cm which gives a cross-sectional area of about $10^{-9}$ cm$^2$ as contrasted with minimum areas of about $10^{-6}$ cm$^2$ in prior art SNS devices. The critical super current $I_c$ corresponding to such smaller cross-sectional areas is substantially reduced. Thus, assuming the critical supercurrent density of gold is about $10^6$ A/cm$^2$ or about one-tenth that of bulk tin, the critical current for my SNS structure is of the order of one milliampere.

The approximate resistance of an SNS structure built in accordance with my invention is given by the resistivity of the normal metal, times the length of the current path in the normal-metal, divided by the cross-sectional area, i.e., $\rho \times d \div w \times d = \rho/w$. For the dimensions previously given, and a gold normal metal layer having $\rho = 10^{-6}$ ohm-cm, the resistance is about $10^{-3}$ ohms. In contrast, for a conventional SNS sandwich structure of thickness 100 Angstroms and transverse dimensions of about $10^{-3} \times 10^{-3}$ cm$^2$ the resistance is only $10^{-6}$ ohms. As mentioned previously, the considerably larger resistance of my structure is advantageous for impedance matching to conventional electronic circuitry.

It is to be understood that the above-described arrangements are merely illustrative of the many possible specific embodiments which can be devised to represent application of the principles of my invention. Numerous and varied other arrangements can be devised in accordance with these principles by those skilled in the art without departing from the spirit and scope of the invention.

What is claimed is:

1. An SNS supercurrent device comprising first and second superconductive regions separated from one another by an intermediate region, a normal-metal region in electrical contact with said first and second superconductive regions and bridging said intermediate region, and an insulative region disposed in said intermediate region contiguous with said first and second superconductive regions, said insulative region being effective to prevent substantial supercurrent tunneling therethrough when a current source is connected between said superconductive regions, so that supercurrent flows between said superconductive regions in a path including that portion of said normal metal region which bridges said intermediate region said portion having an effective cross sectional area to said supercurrent of less than $10^{-6}$ cm$^2$.

2. The device of claim 1 wherein said insulative region is formed oxidation of one of said superconductive regions.

3. The device of claim 1 wherein said normal metal region comprises a normal metal layer N having at least one major surface, said first superconductive region comprises a layer S1 contiguous with a first portion of said major surface of N, said second superconductive region comprises a layer S2 2 contiguous with a second portion of said major surface of N mutually exclusive with said first portion and defining therebetween said intermediate region on said major surface of N, and said insulating region comprises a layer I contiguous with S1 and S2 and having a minor surface thereof contiguous with at least a part of said intermediate region of N.

4. The device of claim 3 wherein layer I is formed by oxidation of layer S1.

5. The device of claim 4 wherein said layer S1 has an elongated stripe geometry extending in a first direction and layer S2 also has an elongated stripe geometry extending in a second direction nonparallel with said first direction so that S2 overlaps S1 and is separated therefrom by layer I.

6. The device of claim 5 wherein said layer I has a thickness of at least 100 angstroms approximately.

7. The device of claim 5 wherein the cross-sectional area corresponding to the thickness of layer I multiplied by the width of layer S2 is approximately $10^{-9}$ cm$^2$.

* * * * *